United States Patent [19]
Smiley, Jr.

[11] 3,763,712
[45] Oct. 9, 1973

[54] INSTRUMENT CONTROL LINKAGE

[76] Inventor: Nolan Smiley, Jr., P. O. Box 916, McCamey, Tex. 79752

[22] Filed: Feb. 8, 1972

[21] Appl. No.: 224,461

[52] U.S. Cl. .................................................. 74/96
[51] Int. Cl. ............................................. F16h 21/44
[58] Field of Search .................. 74/96, 98, 99, 29; 73/411, 412

[56] References Cited
UNITED STATES PATENTS

| | | | |
|---|---|---|---|
| 1,923,240 | 8/1933 | Tarr | 73/411 |
| 1,993,637 | 3/1935 | Wardenburg | 73/411 |
| 2,644,335 | 7/1953 | Dickie | 73/411 |
| 3,075,390 | 1/1963 | Sheppard | 73/411 |
| 2,859,554 | 11/1958 | Walss | 74/99 |
| 3,062,062 | 11/1962 | Loomis | 74/99 |
| 3,092,344 | 6/1963 | Dinsmore et al. | 74/99 |
| 3,475,973 | 11/1969 | Blazek et al. | 74/29 |

*Primary Examiner*—Charles J. Myhre
*Assistant Examiner*—Wesley S. Ratliff, Jr.
*Attorney*—Marcus L. Bates

[57] ABSTRACT

A control linkage for a recording type instrument which connects a sensing element to an indicating element. The control linkage is comprised of an element input link which moves a follower. The follower is captured to a guide means associated with a laterally arranged rail. A second follower is captured within the guide means of a second rail, with the two followers being connected together by an interconnecting link. An output link connected to the second follower actuates the indicating element.

A sensor element pivotally moves the element input link which in turn causes pivotal movement of the output link by means of the control linkage. The accuracy attained with the control linkage is much greater than that of the prior art bell crank system.

8 Claims, 7 Drawing Figures

PATENTED OCT 9 1973 3,763,712

PATENTED OCT 9 1973 3,763,712

INSTRUMENT CONTROL LINKAGE

BACKGROUND OF THE INVENTION

Recorder type instruments having a pointer which is supplied with a pin or stylus arranged to print out on a moving paper chart are old in the art. Some recorders use a circular chart, while others use a roll chart which is continuously unwound from a roll or a drum. The speed of the chart is usually governed by a clock in order to provide for a plot against time.

In the prior art recorders, such as for example recorder Model 40 manufactured by the Foxboro Company, or recorder series FS and SS manufactured by the American Meter Company, the control linkage which interconnects the sensor element to the stylus is usually comprised of bell-cranks connected together by a crossover link. The non-linearity of the control linkage inherently produces an error in recording onto the chart the signal received from the sensor element.

The sensing element, which can be a pressure element such as a bourdon tube, usually leaves the manufacturer in a condition whereby the magnitude of the signal relative to the movement of the element input link is linear. However, as the sensor element becomes old it must be replaced because its characteristics change, although its linearity is still present. That is, change in the characteristics of the element occurs, although the element remains linear over a limited range of pressure.

It is therefore desirable to provide improvements in a control linkage for connecting a sensor element to an indicating element wherein the control linkage is inherently more accurate than similar prior art devices, and wherein the control linkage can be used in conjunction with sensor elements which have changed characteristics, but have not lost their linearity.

SUMMARY OF THE INVENTION

In an instrument having a sensing element connected to an indicating element, a control linkage for connecting the sensor element to the indicating element, comprising: an element input link connected to a primary follower. The primary follower is captured to a laterally arranged rail, wherein the follower can travel longitudinally of the rail and of the input link. A secondary follower is captured by a longitudinally extending marginal end portion of an output link and also by a longitudinally disposed guide means formed on a second rail. The two followers are connected together by an interconnecting link so that the sensor element moves the element input link which in turn moves the output link by means of the improved control linkage.

The unexpected advantage in the improvements of this invention includes increased accuracy in measuring when the improved control linkage is substituted for some prior art control linkages, and in utilizing the improved control linkage in conjunction with sensor elements which have changed characteristics.

A primary object of this invention is the provision of improvements in control linkages.

Another object of the invention is to provide a control linkage for connecting a sensor element to an indicating element wherein the indicating element more accurately reproduces the signal or the movement of the sensor element.

A further object of this invention is to disclose and provide a control linkage which can be directly substituted for prior art control linkages, so that replacement of the sensor element is often avoided, and at the same time the accuracy of measurement is increased.

A still further object of this invention is to provide a control linkage for connecting a sensor element to an indicating element which eliminates some of the criticality heretofore associated with a sensor element.

Another object of this invention is to provide a control linkage which increases the linearity involved in measuring signal magnitude.

An additional object is to provide a control linkage for connecting a sensor element to an indicating element of a recording instrument which is rugged in construction, inexpensive to manufacture, less complicated in design, and which is accurate over its entire range as compared to similar prior art devices.

These and various other objects and advantages of the invention wil become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE DRAWINGS

Throughout the various figures of the drawings, like numerals will occasionally be used to indicate like elements whenever it appears logical to do so.

Figure 1:
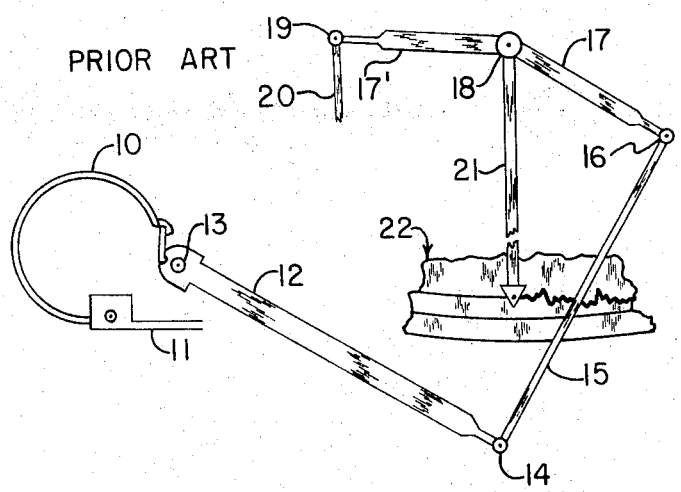
FIG. 1 is a part diagrammatical, part schematical, fragmentary representation of a prior art control linkage, with parts thereof being broken away so as to conserve drawing space.

In FIG. 1, a simplified prior art representation of part of an instrument is shown, wherein a sensor element 10 is affixed by means of element 11 to any convenient portion of the housing or base of an instrument, in the usual manner. An element input link 12 is provided with the usual element input pivot 13 so that the sensor element can pivotally move the depending end 14 of the link about the pivot. End 14 is journaled to a crossover link 15, hereinafter called an interconnecting link. The depending end of the interconnecting link is journaled at 16 to the depending end of an output link 17. The output link is pivotally affixed to the main body of an instrument by means of an output pivot 18. Pin 21 is affixed to and moves with link 17, and is provided with the illustrated stylus thereon. Portion 17' is a continuation of link 17 and is journaled at 19 to member 20 so that various functions or modifications of the signal characteristics can be imparted into the apparatus, as is known to those skilled in the art.

Looking now to the details of the remaining figures, which disclose the invention, and wherein a control linkage made in accordance with the present invention is illustrated. There is seen diagrammatically illustrated in FIG. 2 a pivoted end of an element input link, the marginal end of which has been provided with a guide means 24 in the form of a longitudinally extending slot.

A rail 25 is provided with a fastener means at pivoted end 26, and a guide means 27 disposed longitudinally of the rail. The guide means is in the form of a slot.

A primary follower 28 is captured within each of the guide means and is movable therewithin in accordance with the relative position of the element input link and the rail.

An interconnecting link 29 having adjustment 29' interposed therein has one depending end thereof connected to the primary follower. The output link has a terminal end 30 inwardly of which there is disposed a longitudinally extending guide means 31 in the form of a slot. Guide means 32 is in the form of a slot which is longitudinally disposed along a secondary rail 33. Fastener 34 forms a pivot point about which the rail can be pivoted any desired amount allowed by the circumferentially extending length of groove 132 formed within mount 133. The mount is affixed to structure associated with the instrument housing (not shown). The before mentioned fastener means 26 cooperates in a similar manner with the groove 132' formed within the mount means 133'.

A secondary follower 35 is attached to the remaining depending end of the interconnecting link. The follower is captured within the two guide means provided by the secondary rail and the output link. Hence, it is evident that if desired, the two followers, the two spaced apart rails, and the guide means may be identical in construction. The primary rail associated with the drive element preferably is arranged 45° relative to the input link and interconnecting link, as illustrated at 25'.

Figure 2:
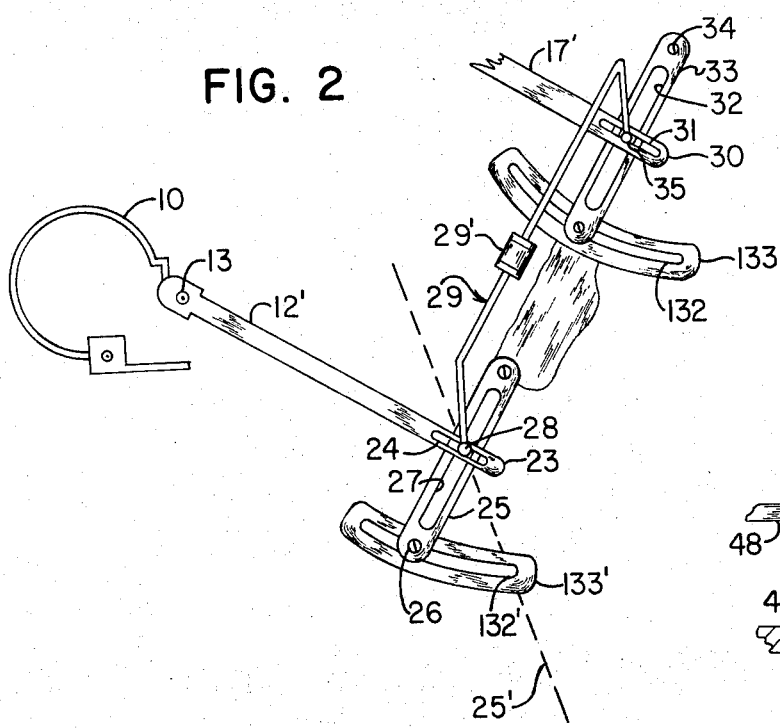
FIG. 2 is a diagrammatical, fragmentary representation of a control linkage made in accordance with the present invention.
Figure 3:
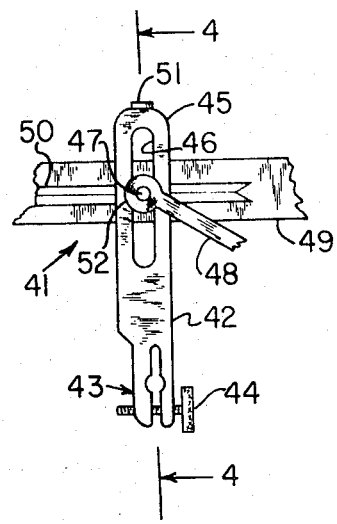
FIG. 3 is an elarged fragmentary enlarged which sets forth one modification of part of the apparatus disclosed in FIG. 2.
Figure 4:
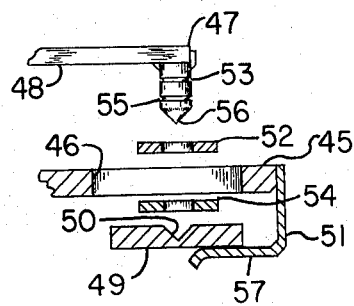
FIG. 4 is an enlarged, fragmentary, part-cross-sectional exploded view taken along line 4—4 of FIG. 3.

FIGS. 3 and 4 set forth in greater detail a modification of FIG. 2 wherein apparatus 41 can be utilized as either the primary or secondary portion of the control linkage assembly disclosed in FIG. 2. The apparatus includes a body 42 having a bifurcated depending end 43 which is provided with the illustrated diametrically arranged fastener means 44. The opposed end 45 has a guide means 46 formed therein, which for purposes of illustration is shown as being in the form of an elongated longitudinally disposed slot. Follower 47 pivotally captures a terminal end portion of interconnecting linkage 48 in aligned relationship with the guide means. The linkage 48 is disposed 45° relative to the rail and accordingly body 42 is equivalent to input link 12'.

Rail 49 is provided with guide means 50 which, for the purpose of illustration is shown to be in the form of a longitudinally extending groove. Spring 51 vertically depends in a downward direction and is bent rearwardly into underlying relationship relative to the rail so that the various illustrated parts are maintained properly assembled in captured relationship relative to one another. Split washer 52 is received within the illustrated groove 53 of the follower, while split washer 54 is received within groove 55 with the main body 42 being sandwiched therebetween in the indicated manner of FIGS. 3 and 4. Conical portion 56 of the follower is slidably received within groove 50 and can be moved from one extremity of the groove to the other by the input link.

Figure 5:
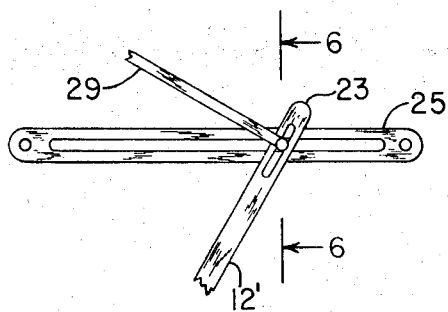
FIG. 5 is a schematical representation of another form of the invention.
Figure 6:
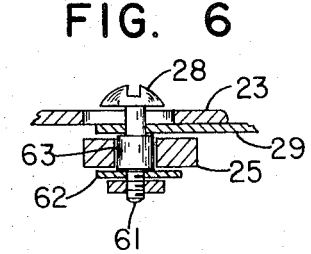
FIG. 6 is an enlarged, fragmentary, cross-sectional representation as may be taken along line 6—6 of FIG. 5, for example.

Looking now to the details of FIGS. 5 and 6 which set forth still another form of the invention disclosed in the previous figures, and wherein interconnecting link 29 is seen to be affixed to the rail and the link by a fastener means 28. The fastener means is provided with a low friction roller 63 which is slidably received upon the shank portion of the fastener, with a washer 62 preventing end 61 of the fastener from becoming disengaged therefrom.

Figure 7:
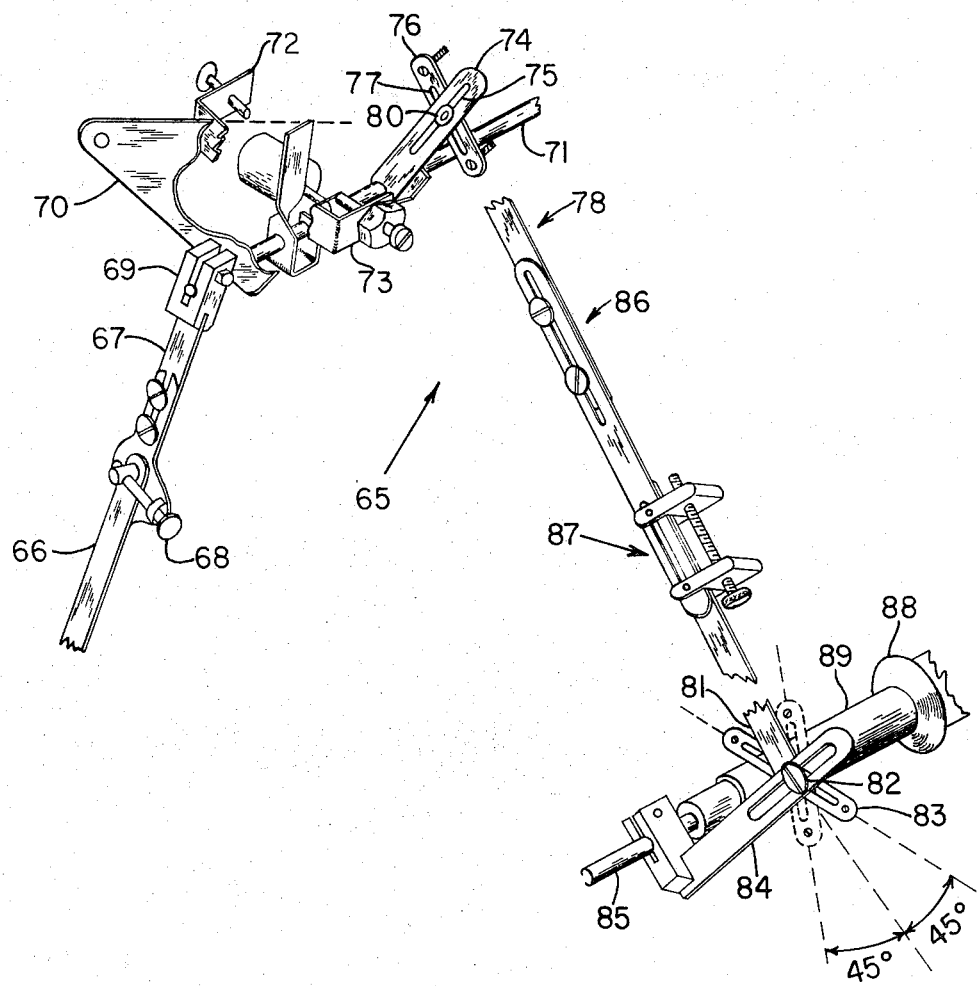
FIG. 7 is a broken perspective view of the present invention, illustrated in its operative configuration in conjunction with some prior art apparatus.

A more detailed operative form of one of the embodiments of the invention is disclosed in FIG. 7, wherein the control linkage 65 interconnects a sensor element to an indicating element. As seen illustrated in the figure, an output link 66 is connected to portion 67 by means of micrometer adjustment 68. Enlarged end portion 69 of the link is removably affixed to the depending free end of shaft 71. The shaft is journaled to plate member 70 which in turn is affixed to or forms part of the instrument housing. Stop means 72 limits the travel of the output linkage as it is pivoted by the shaft. Adjustment 73 is a damper with which those skilled in the art are familiar. Link 74, which can be considered to be a continuation of 67, is provided with guide means 75. Rail 76 includes a guide means 77 longitudinally disposed therein.

Interconnecting link 78 is affixed to follower 80 as in the before described manner of FIGS. 2-6 while the remaining opposed end portion 81 is affixed to the primary follower 82. Rail 83 is provided with the illustrated guide means which is arranged 45° relative to the interconnecting link. The output linkage 84 includes the illustrated guide means formed therein. Input shaft 85 is anchored to the inlarged end portion of input link 84 and moves the follower 82 in response to movement thereof.

Adjustment 86 provides for large changes in the length of the interconnecting link, while micrometer adjustment 87 provides for small adjustments. Hub 88 supports shaft housing 89 and is affixed to the base of the instrument. A sensing element is naturally affixed to and drives the shaft 85.

In operation, the apparatus disclosed in FIGS. 3 and 4 can be substituted for the control linkage of a prior art recording instrument in the illustrated manner of FIG. 7, for example.

The operation of the apparatus is best understood by comparing the embodiment of FIG. 2 with the prior art apparatus of FIG. 1. In FIG. 1, the bourdon tube 10 is connected to a flow conduit and receives a pressure signal which causes the input link 12 to pivotally move about pivot 13, thereby moving pin 21 an amount which is dependent upon the mechanical advantage presented by the differences in the length of the input and output links 12 and 17, respectively. The minimum error of the recorded signal placed upon chart 22 occurs when the input and output links are arranged perpendicularly with respect to the cross-over link.

In order to still further reduce this inherent error which occurs in measuring the signal received at 10, the element input and output links are modified in accordance with FIGS. 2 and 7 by incorporating thereon apparatus made in accordance with the teachings of FIGS. 3–6. As seen in the schematical representation of FIG. 2, as the input link pivots about the input pivot, the follower is forced to move within the guide means 27. While the guide means is illustrated as being arranged laterally with respect to the input link, it should be understood that it is preferred that the guide means be arranged along line 25' and not necessarily disposed perpendicularly to the input link, as evidenced by the adjustment means 133' and 26. Since the pivoted end 23 of the input link moves both longitudinally and arcuately relative to the rail, the follower moves longitudinally of the guide means 24 and 27, with the guide means moving the interconnecting link an amount which is directly proportional to the movement effected by the sensor element.

The secondary follower is captured within the guide means of the secondary rail and the output link, and as the output link is moved by the interconnecting link, the follower is free to move longitudinally within each of the guide means, thereby moving the secondary follower an amount directly proportional to the movement of the primary follower 28. The multiplication of a pen connected to link 17' is dependent upon the relative lengths of the input and output links, as well as the relative position of slots 27 and 32.

In the specific illustration of FIG. 7, the present invention has been adapted for use in an American Series FS or SS dry flow orifice meter manufactured by the American Meter Company.

As seen in the illustration of FIG. 7, elements 74, 76; and element 83, 84 are essentially the apparatus disclosed in FIGS. 3 and 4. As the sensing element rotates shaft 85, lever 84, which is the input link, moves follower 82 within the guide means, so that interconnecting link 78 moves follower 80. The follower 80 likewise is disposed within its associated guide means and moves output linkage 74 in response to movement of shaft 85. The output link moves shaft 71 which in turn moves the pin 66, thereby enabling a stylus or the like to draw a curve on a moving graph which is indicative of and proportional to movement of shaft 85.

In order to calibrate the apparatus of FIG. 7, the reference pressure on the primary element should provide a "0" on the chart, ie, if 3 psi is "0" and 15 psi is "100%" range, then 3 psi imposed upon the element should cause pin 66 to assume a position which causes the stylus to draw a curve at the "0" reading on the chart. Should an adjustment be required, the rail 83 is moved about its pivoted end until the "0" reading is attained. If the interconnecting linkage 78 has been properly adjusted at 86 and 87, then the "50%," "75%," and "100%" reference pressure on the primary element will now provide for its proper proportion of the "100%" of range.

The present invention enables the primary element tobe made smaller and more rugged with less movement being effected, as compared to the prior art linkage. Where a bellows is used, less convolutions can be utilized therein, thereby providing for a more inexpensive and a more rugged bellows.

Often a primary sensor, such as a bourdon tube, must be renewed and the old one discarded, because its deflection characteristics have changed, although it still remains linear. This is usually due to the bourdon tube having been overstressed or having been used in high pressure applications over an extended period of time. With the present invention it is unnecessary to change the expensive bourdon tube merely because the deflection characteristics have changed, because the present invention enables the rails thereof to be adjusted so as to attain a proper reading on the chart which is consistent with the range of the reference pressure.

The accuracy of the present invention depends upon the drive angle, as in the prior art systems; however, for any particular angle of displacement the present invention is approximately twice as accurate as the prior art system of FIG. 1. Where the prior art system approaches 1 percent accuracy, the present invention approaches ½ percent accuracy, for example. The present invention can be rapidly adjusted, and can be directly substituted for the control linkage of many prior art systems, and the accuracy attainable is believed to be duplicated only by electronic measuring devices.

It should be understood that it is unnecessary to render both the primary and secondary rails adjustable, and that where desirable, the assembly disclosed in FIGS. 3–5 can be used in conjunction with apparatus other than recorders.

I claim:

1. In combination with a recording type instrument having a sensing element and an indicating element, a control linkage connecting the sensor element to the indicating element comprising:

an input link having guide means formed thereon; means pivotally mounting said input link to cause said guide means thereof to be pivotally moved in response to movement of the sensor element; a rail having guide means formed thereon; and an interconnecting link having a follower formed thereon;

means by which said follower is captured by each said guide means so that said follower can be moved longitudinally along each said guide means;

a second rail, guide means formed on said second rail, an output link, guide means formed on said output link, a second follower affixed to said interconnecting link;

means by which said second follower is captured by and moves longitudinally along said guide means of said second rail and said output link;

means pivotally mounting said output link to cause said guide means thereof to be pivotally moved by said second follower; means connecting said output link to said indicating element so that movement of said input link by said sensor causes a proportional movement of said indicating element.

2. The control linkage of claim 1 wherein said guide means formed on said input link is a longitudinally extending slot formed in a marginal end portion thereof; said guide means formed on the first recited rail being a longitudinally extending slot formed in a marginal portion of said first rail;

means mounting said first rail with the slot thereof being superimposed upon the slot of said input link; the first said follower being received within the said slot of the first rail and the slot of the input link so that pivotal movement of said input link causes the first said follower to move longitudinally within each of the slots to which it is connected, thereby causing said interconnecting link to be moved in response to movement of said input link.

3. The control linkage of claim 1 wherein said guide means formed on said output link is a longitudinally extending slot formed in a marginal end portion thereof;

said guide means formed on said second rail is a longitudinally extending slot formed in a marginal portion thereof;

means mounting said second rail with the slot thereof being superimposed upon and arranged at an intersecting angle with respect to the slot of said output link;

each said follower extending through each said slot so that pivotal movement of said output link causes each said follower to move longitudinally within each said slot, and to cause said interconnecting link to be moved in response to movement of said input link.

4. In an instrument having a sensor and an indicator, a control linkage for connecting the sensor to move the indicator comprising a base, an input link, and an output link; means by which said input and output links are pivotally affixed to said base;

guide means formed longitudinally along a marginal pivoted end of said input link, guide means formed longitudinally along a marginal pivoted end of said output link;

spaced rails, means supporting said rails from the base so that the relationship of the rails can be changed relative to one another; guide means formed in each said rail;

said guide means of said input link being superimposed upon and arranged at an intersecting angle respective of the guide means of one said rail;

said guide means of said output link being superimposed upon and arranged at an intersecting angle respective of the guide means of the remaining said rail;

an interconnecting link having a follower means formed at the depending ends thereof;

one said follower means being captured within said superimposed guide means of said input link and rail; the remaining follower means being captured within said superimposed guide means of said output link and rail;

whereby: movement of said input link moves the follower within the guide means of said input link and its rail to thereby move said interconnecting link, which imparts movement into the second follower, which imparts movement into said output link.

5. The control linkage of claim 4 wherein said guide means is elongated and longitudinally extending in form and which receives said follower thereon so that said follower can move longitudinally of the guide from one to the other limits thereof.

6. The control linkage of claim 4 wherein said guide means formed on said input link is a longitudinally extending slot formed in a marginal end portion thereof; said guide means formed on said rail is a longitudinally extending slot formed in a marginal portion of said rail;

means mounting said rail with the slot thereof being superimposed upon and arranged to form an intersecting angle with respect to the slot of said input link;

said follower extending through each of said superimposed slots so that pivotal movement of said input link causes said follower to move longitudinally within each said slot, and to casue said interconnecting link to be moved in response to movement of said input link.

7. The control linkage of claim 4 wherein said guide means in one said rail is a longitudinally extending groove, and said guide means in said input link is a longitudinally extending slot; said follower extending through the last said slot and into registry with said groove.

8. The control linkage of claim 4 wherein each said rail includes means by which the guide means thereof can be pivotally moved so as to change the relative position of the guide means respective to the interconnecting link.

* * * * *